(12) United States Patent
Fleury et al.

(10) Patent No.: US 7,778,175 B2
(45) Date of Patent: Aug. 17, 2010

(54) METHOD OF MANAGING REQUESTS FOR REMOTE ACCESS TO MULTIMEDIA CONTENTS

(75) Inventors: Jean-Francois Fleury, Beijing (CN); Gilles Straub, Acigne (FR); Jean-Baptiste Henry, Melesse (FR)

(73) Assignee: Thomson Licensing, Boulogne-Billancourt (FR)

( * ) Notice: Subject to any disclaimer, the term of this patent is extended or adjusted under 35 U.S.C. 154(b) by 341 days.

(21) Appl. No.: 11/820,997

(22) Filed: Jun. 20, 2007

(65) Prior Publication Data
US 2008/0084896 A1 Apr. 10, 2008

(30) Foreign Application Priority Data
Jun. 29, 2006 (FR) .................. 06 05886

(51) Int. Cl.
*G01R 31/08* (2006.01)
(52) U.S. Cl. .................................. 370/230.1
(58) Field of Classification Search .............. 370/236.1, 370/229, 468, 328, 338, 230.1, 231, 235, 370/236
See application file for complete search history.

(56) References Cited
U.S. PATENT DOCUMENTS
6,310,857 B1 * 10/2001 Duffield et al. ............. 370/232
7,337,231 B1 * 2/2008 Li ............................... 709/231
2006/0095944 A1 * 5/2006 Demircin et al. .............. 725/81

OTHER PUBLICATIONS

Segarra j; Cholvi V: "Simulations on batching in video-on-demand transmissions" Proceedings of the International Conference on Computational Science (Lecture Notes in Computer Science 2660), Jul. 2003, pp. 452-462, XP002422191 Melbourne, Australia p. 454-p. 456.
French Search Report.

* cited by examiner

*Primary Examiner*—Kwang B Yao
*Assistant Examiner*—Jung Liu
(74) *Attorney, Agent, or Firm*—Robert D. Shedd; Harvey D. Fried; James McKenzie

(57) ABSTRACT

In a method of managing a request for remote access to a multimedia content, a corresponding datum stream is inserted at the instant or in a delayed manner with the set of the data streams being transmitted on a distribution network as a function of a capacity threshold of this network. Each data stream is of the variable-throughput type, with a data throughput profile corresponding, whose width corresponds to a time of transmission of the stream. The management of the request comprises a verification that the capacity of the network is not exceeded on the width of the profile, as a function of a given instant of insertion, of the throughput of the data stream or streams in progress on the said distribution network, obtained on the basis of the throughput profiles of these streams, and of the throughput profile of the requested stream.

13 Claims, 12 Drawing Sheets

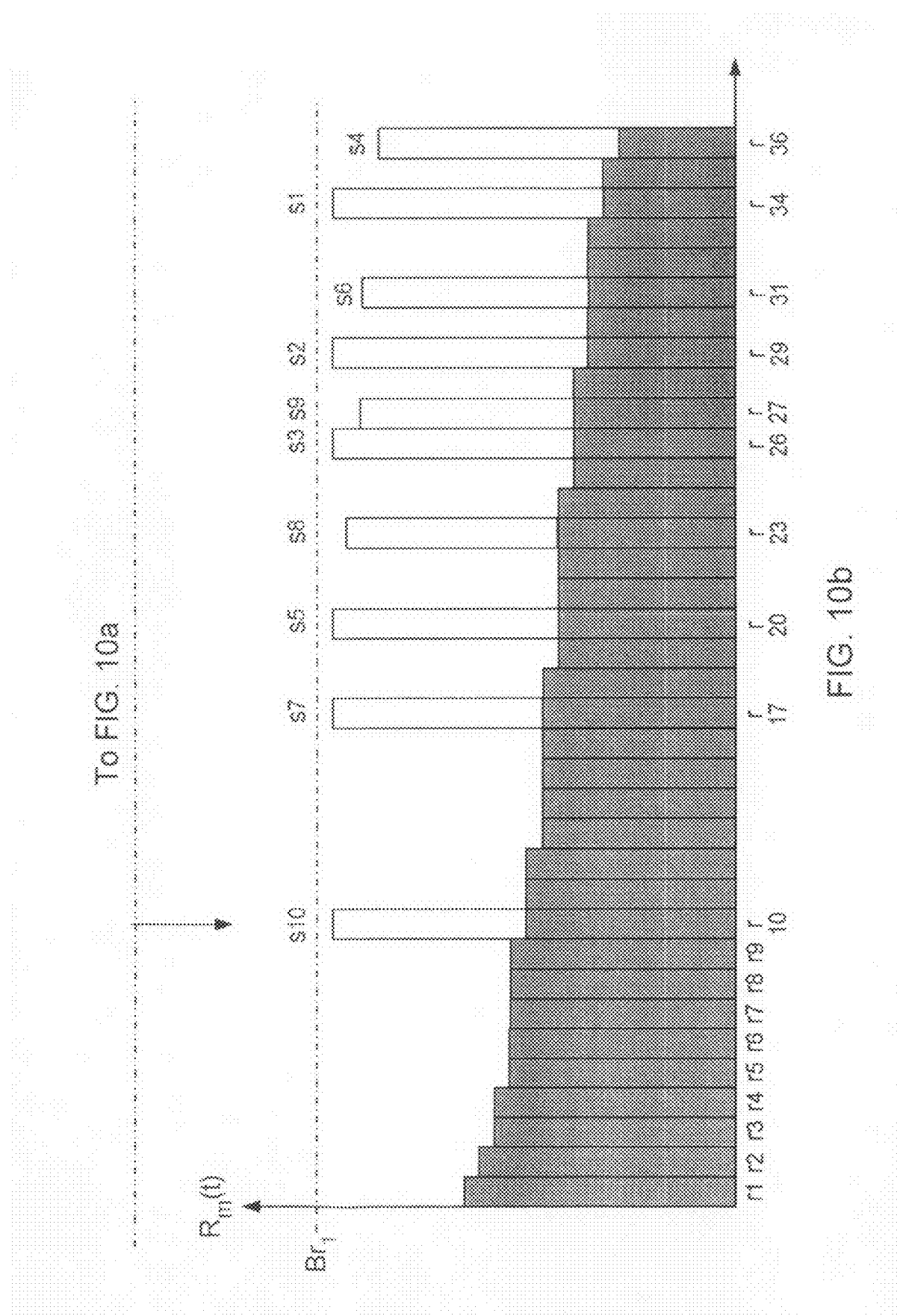

METHOD OF MANAGING REQUESTS FOR REMOTE ACCESS TO MULTIMEDIA CONTENTS

This application claims the benefit, under 35 U.S.C. §119 of French Patent Application 06/05886, filed Jun. 29, 2006.

1. TECHNICAL FIELD

The present invention relates to a method of managing requests for remote access to multimedia contents. It is addressed in particular at video on demand transmission services, termed VoD services (the acronym standing for "Video on Demand").

2. STATE OF THE ART

Real-time video transmission services are currently proposed, which rely on transmission networks using DSL digitized subscriber lines, and multimedia servers which provide these contents in real time. They allow users to view multimedia contents remotely.

Among these services, VoD services are rathermore "á la carte" services: it is the user who chooses a film, a documentary or the like from a library of multimedia contents, so as to view it remotely, at the time he requests it, doing so interactively, in the manner of a DVD reader or a video recorder: pause, rewind, fast forward etc. With such a VoD service, when a user asks to view a given multimedia content, a corresponding video stream is transmitted on the distribution network, by a transmitter which shapes the multimedia data stream that it receives from the server, and dispatches it to the core of the network destined for the user terminal. At a given moment, there are as many video streams on the network as user requests served. The total bandwidth of the network is thus shared between the users.

A data transmission network offering a VoD service according to the state of the art is represented diagrammatically in FIG. 1, in the context of an access through a digitized subscriber line DSL of a user to the transmission network. It is given only by way of example. Other types of connection can be envisaged between the user and the transmission network.

In a context of DSL lines, a network for transmitting a VoD service usually comprises a distribution network 1, also called the network core and to which a plurality of users (or more accurately of user terminals) $CPE_1$ to $CPE_5$ have access through an access network 2. The access network 2 comprises DSL line concentrators and access multiplexer equipment which are usually called DSLAMs in the specialized technical literature (Digital Subscriber Line Access Multiplexer). Represented in the example are a concentrator 20 and two DSLAMs denoted 21.1 and 21.2. A real time distribution server 4 on which multimedia contents 5 are stored, or which provides them, transmits various data streams over the distribution network 1 by means of a transmitter 6 of data streams destined for various users, for example $CPE_1$ and $CPE_4$. Each data stream corresponds to a content requested by a determined user and destined for this user alone: the mode of transmission is thus point-to-point. The transmitter shapes the various streams so as to dispatch them to the network core using well known multiplexing techniques.

The transmission path of a multimedia content stored on the server up to a requester (user terminal) follows various communication links: c1 between the server 4 and the transmitter 6; c2 between the transmitter and the network core 1; c3 in the network core itself; c4 on leaving the network core heading for the concentrator 20; c5, between this concentrator and a DSLAM multiplexer 20. The smallest of these links determines the bandwidth of the transmission network, that is to say the maximum number of bits per unit time that the transmission network can accept, for example 340 Mbit/s.

The server 4 contains in the form of digital files, digital data streams corresponding to each of the multimedia contents proposed by the VoD service concerned. These files result in a known manner from encoding the audio and video data according to the MPEG standard (acronym for "Moving Picture Expert Group"). Under this standard, various types of encoding are proposed. In VoD services, constant-throughput encoding is used, with a compression rate related to the compression algorithm used. The digital data stream which results from such a coding has a throughput which is constant over the duration of the stream, and identical for all the contents (only the duration varies). The constant value R of this throughput is dependent on the characteristics of the coding used. A widespread value is 4 megabits per second.

The Vod transmission network can thus allow a maximum of N users at an instant t, equal to the integer part of the result of dividing the bandwidth of the network by the throughput R of the multimedia data streams. This number N of users which can be served at a given instant is therefore limited by the capacity of the network and the coding technique.

The capacity of networks is constrained by the technology of the communication links used and cannot increase indefinitely. The number of users of a VoD service is therefore necessarily limited or else the service degraded. In particular, in certain time slots, the service demand can be high and consequently a certain number of requests will not be served.

In the invention, a way to improve the service has been sought in optimizing the throughputs of the data streams. Particular interest is paid to variable-throughput coding techniques termed VBR (Variable Bit Rate), which use in particular properties of the images to adapt the compression rate over time and thus improve the quality of the video transmitted. These techniques are in particular used in continuous video transmission services, termed broadcast transmission. So-called "broadcast" transmission is a service which operates on the initiative of the multimedia contents transmitter: a content, for example a film, is transmitted at a given moment, to all the users. The data are dispatched only once and duplicated on the routers of the network, as a function of the paths leading to the users, according to a transmission mode termed multipoint. Each user has the possibility of viewing the transmitted sequence remotely, at the time prescribed by the transmitter, without any interactivity. In these transmission services, the degree of occupancy of the bandwidth of the distribution network is independent of the number of users. It depends only on the number of services proposed at a given moment, this being known. All the routing points are known. These services can then be multiplexed, in a statistical manner, with a guarantee that the bandwidth of the network will not be exceeded.

These variable-rate coding techniques applied to multimedia contents cannot however be applied directly to VoD services, without posing a management problem that is inherent in the operation of these á la carte services: the sharing of bandwidth between users. Specifically, contrary to what happens in "broadcast" transmission, the transmitter that dispatches the multimedia data streams on the network core, cannot use statistical management of the transmitted streams: it cannot envisage which streams will be requested or at what times, since these streams depend directly on the users' requests. Furthermore as each stream has its own variable throughput profile, the transmitter has no predictive information about the streams and their throughputs which ought to be transmitted on the network. In a VoD service, the transmitter therefore is not in a position to manage in a simple and statistical manner, the evolution of the traffic on the network core. It knows in advance neither the routing points in the network, since it does not know who will make a request, nor the data throughput since it does not know which content will be requested. The use of variable-throughput coded streams therefore poses a problem regarding the management of VoD service requests, which goes beyond simple management of the number N of users connected as in the state of the art, and which cannot use statistical mechanisms as in the transmission services of "broadcast" type.

3. SUMMARY OF THE INVENTION

The invention relates to a method of managing requests for remote access to multimedia contents, which allows optimal management of the use of the bandwidth of the transmission network with use of variable-throughput encoded data streams.

The throughput profile of each of the multimedia contents proposed for distribution is a characteristic of the VBR-type MPEG encoding carried out for the multimedia content considered. This is an item of information that can therefore be recorded, for example in the form of a text file, at the same time as the multimedia content is encoded.

According to the invention, the throughput profiles of each of the multimedia contents proposed by the server are utilized so as to implement nonstatistical but controlled management of the use of the bandwidth of the distribution network. The throughput profiles are used to calculate the total profile of the data streams being transmitted on the network, and compare it with the profile of the new stream requested, with respect to the bandwidth of the transmission network. This comparison is performed by making one or more assumptions of an instantaneous and/or delayed insertion of the new stream into the multiplex stream in progress, so as to best utilize the characteristics of the profiles, in particular the position of the throughput peaks and troughs in the profiles of the multiplex and of the new stream. Management according to the invention makes it possible at any moment to optimize the use of the capacity of the network so as to best serve the various users. The service is thus more flexible and makes it possible to increase the number of users who can access it.

The invention relates therefore to a method of managing a request for remote access to a multimedia content from among a plurality of multimedia contents provided by a server in digital data stream form, allowing a transmission of a set of data streams provided by the said server to a distribution network as a function of a capacity threshold of the said distribution network, characterized in that the said digital data streams are of the variable-throughput type, at least one data throughput profile being associated with each stream, and in that for at least part of the remote access requests received, the management method comprises a step of determining at least one instant of insertion of a data stream corresponding to a request received, as a function of a first throughput profile corresponding to the set of streams in progress, and of a second throughput profile corresponding to the throughput profile associated with the stream corresponding to the said request, the said instant of insertion being able to correspond to an instantaneous insertion of the requested stream, or a delayed insertion.

The invention also relates to an apparatus connectable to a distribution network of a system for transmitting multimedia contents on demand provided by a multimedia server in the form of variable-throughput digital data streams, the said apparatus comprising memory resources for storing throughput profiles of the said data streams, and digital processing resources able to implement an algorithm for determining an instant of insertion of a new digital data stream corresponding to a request for access to a multimedia content, to a set of data streams being transmitted on the said network, on the basis of the throughput profiles of the said new stream and of the said data streams in progress.

The invention also relates to a system for transmitting multimedia contents on demand comprising such a control apparatus and a server of multimedia contents in the form of variable-throughput digital data streams, in which throughput profiles corresponding to the said data streams are stored in the server at the time of the encoding of the multimedia contents by which the said data streams are generated, and the said profiles are transmitted by the server so as to be stored in the said apparatus.

4. BRIEF DESCRIPTION OF THE DRAWINGS

Other advantages and characteristics of the invention are detailed in the following description with reference to the illustrated drawings, given by way of nonlimiting example. In these drawings:

FIG. 1 already described, illustrates a network for transmitting multimedia contents on the basis of a multimedia server, making it possible to offer a VoD service;

Figure 3A:
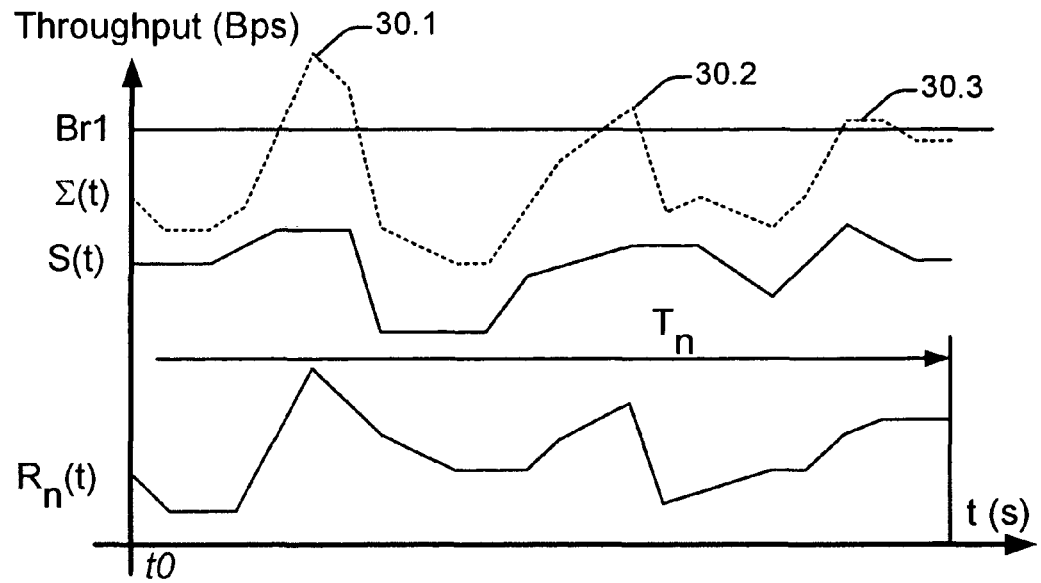
Figure 3B:
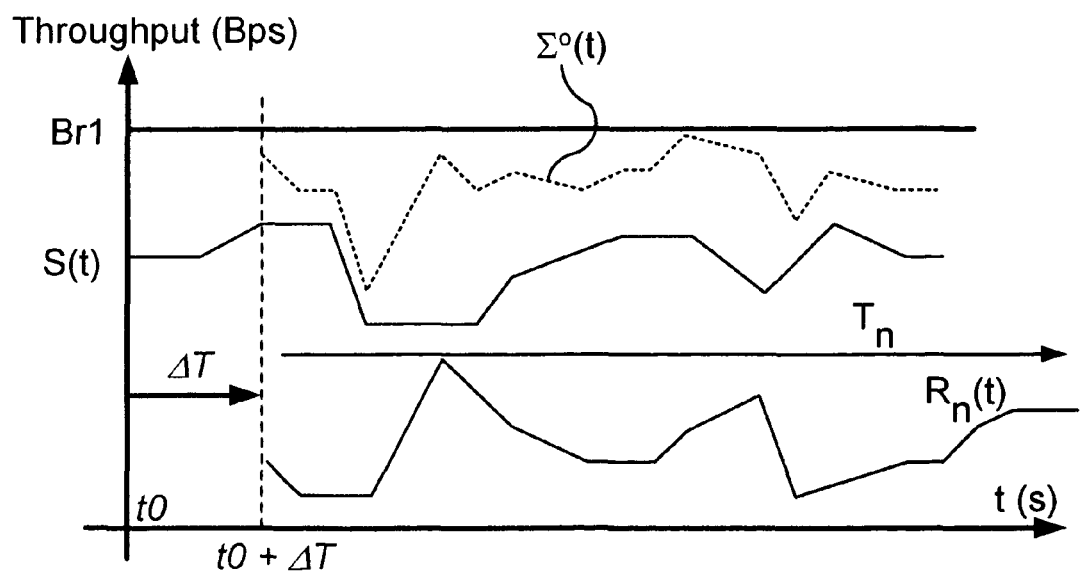
Figure 4:
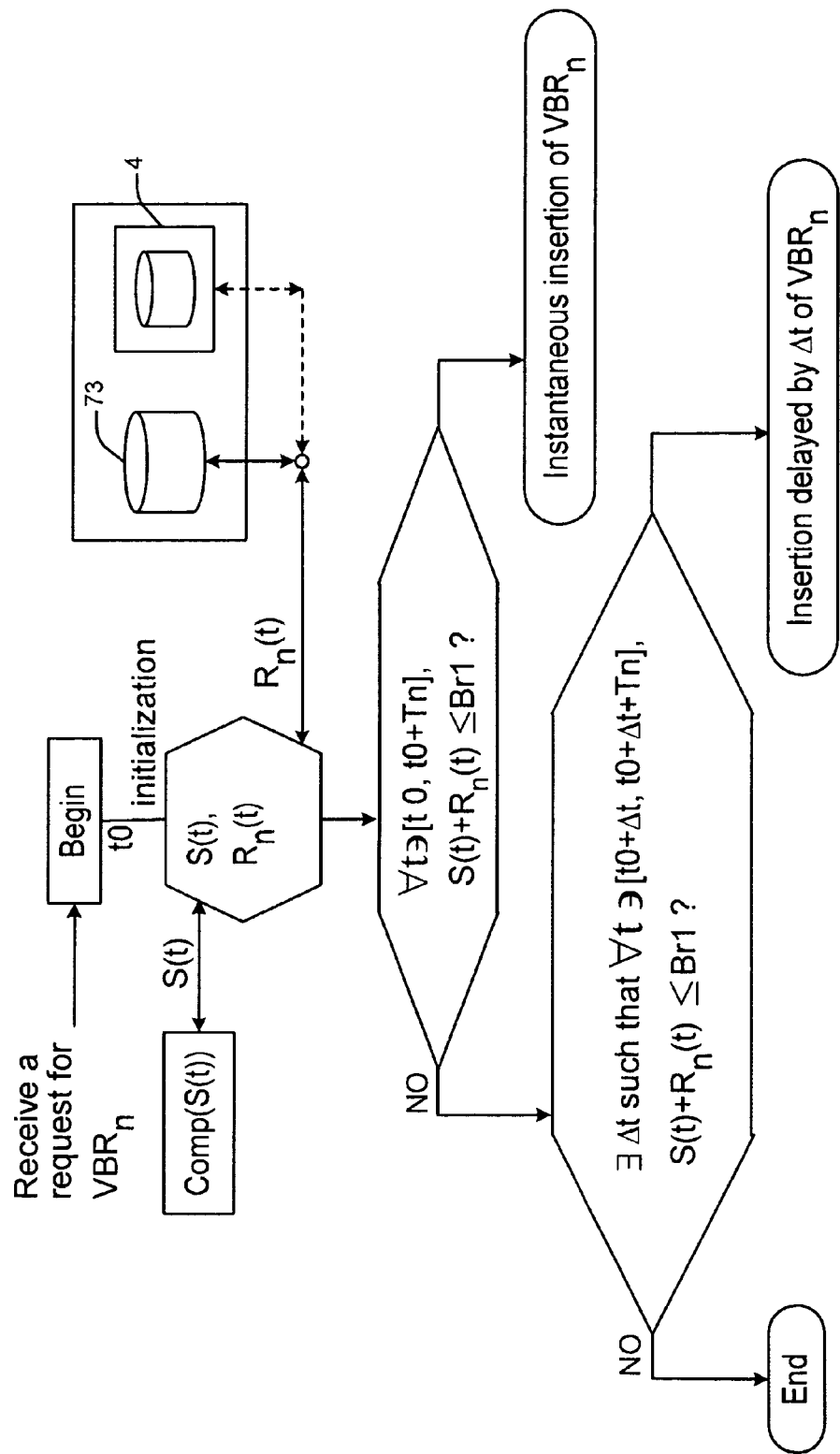
Figure 5A:
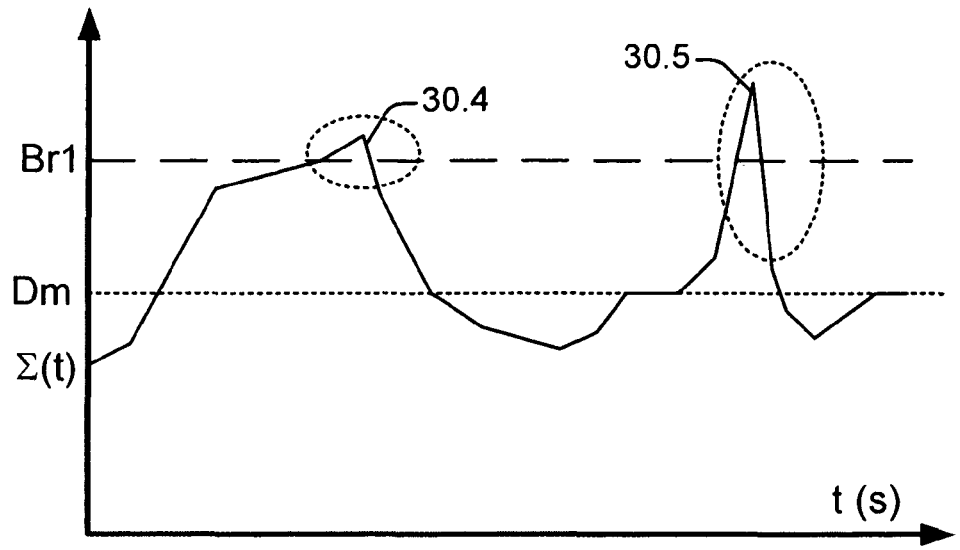
Figure 5B:
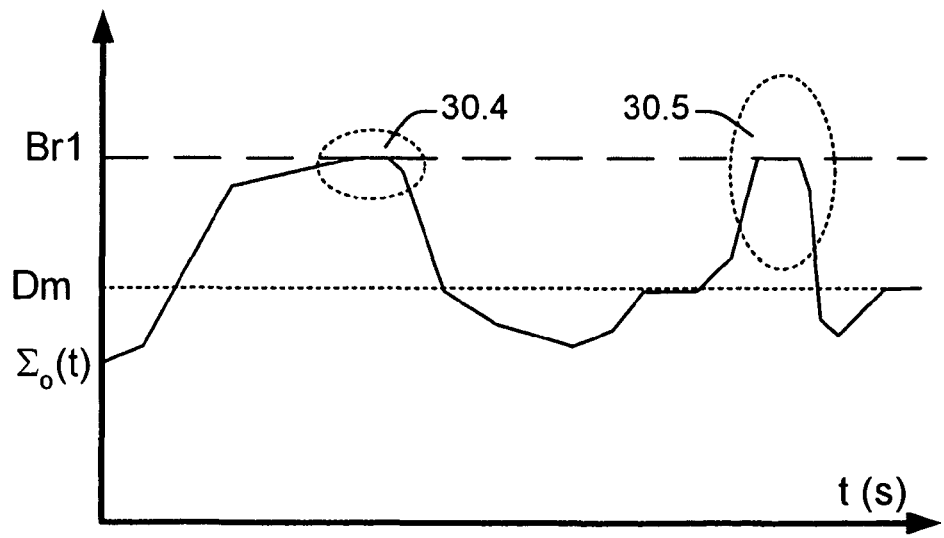
Figure 6:
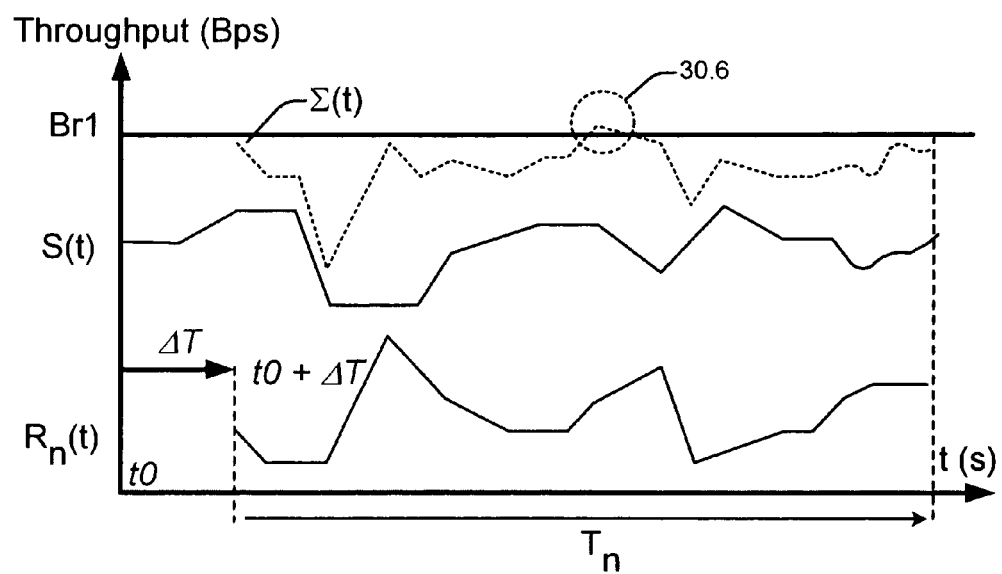
Figure 7:
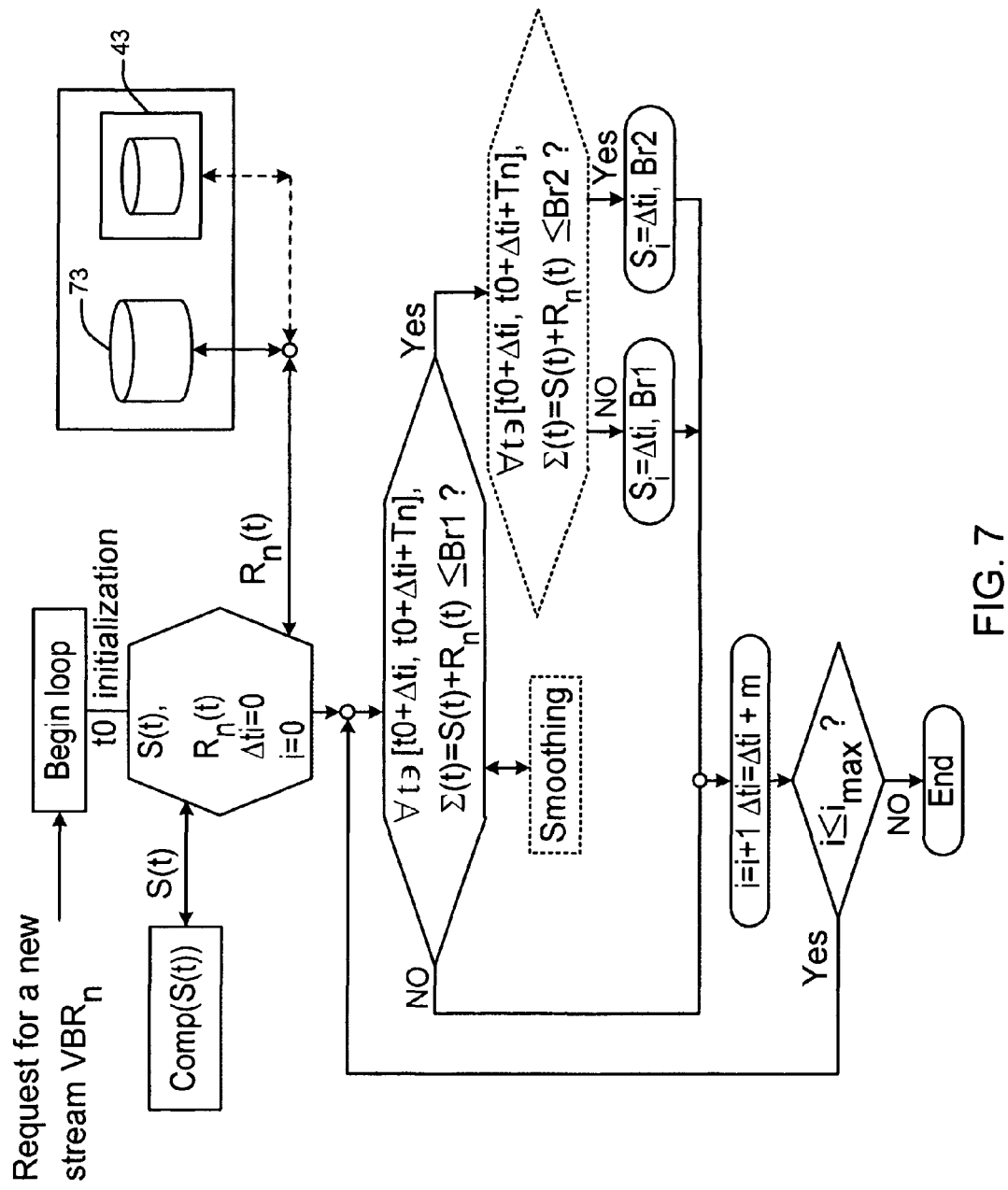
Figure 8A:
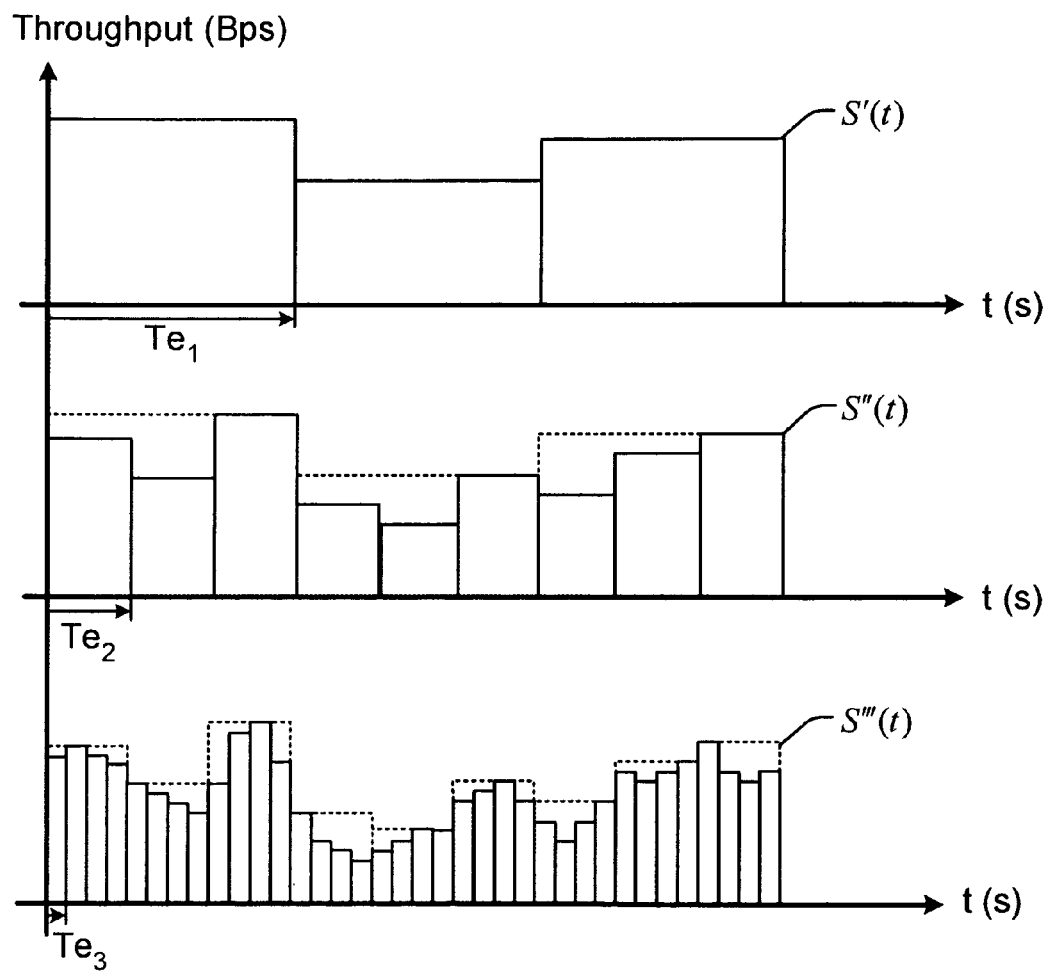
Figure 8B:
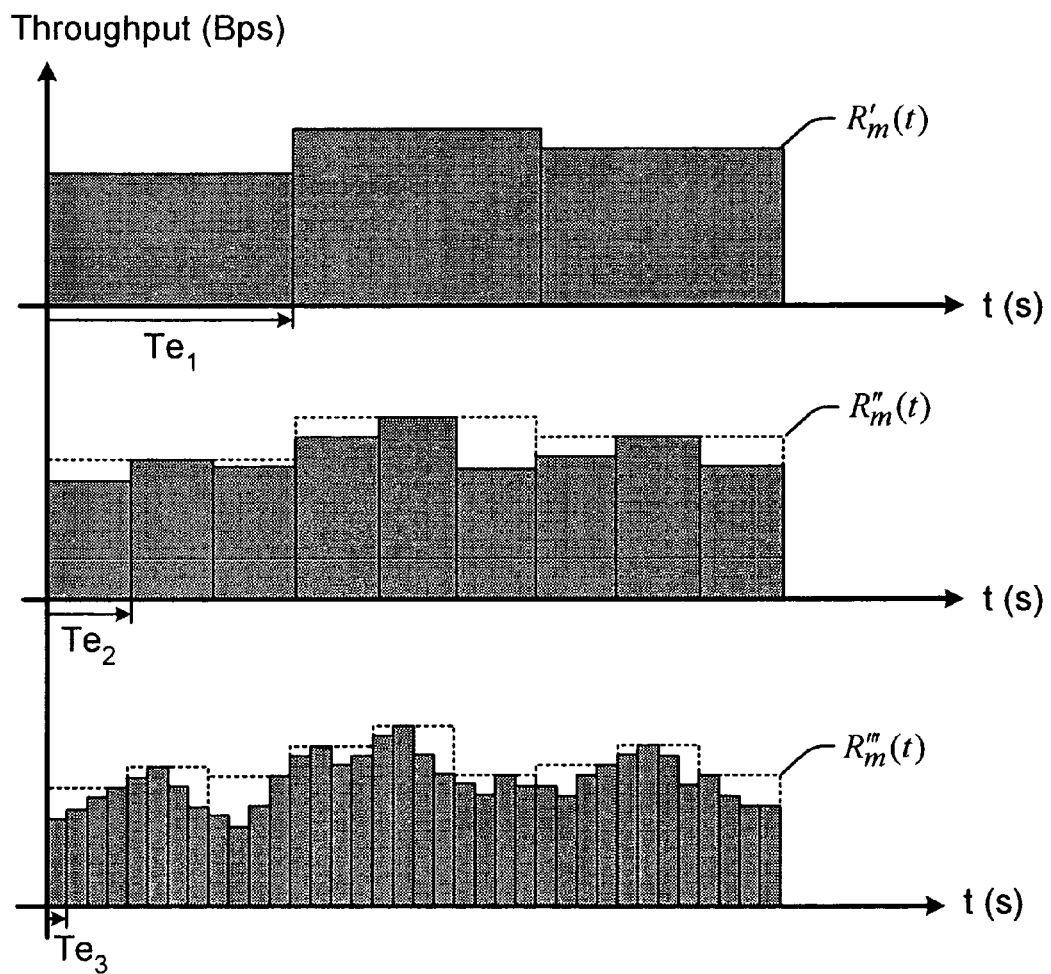
Figure 9:
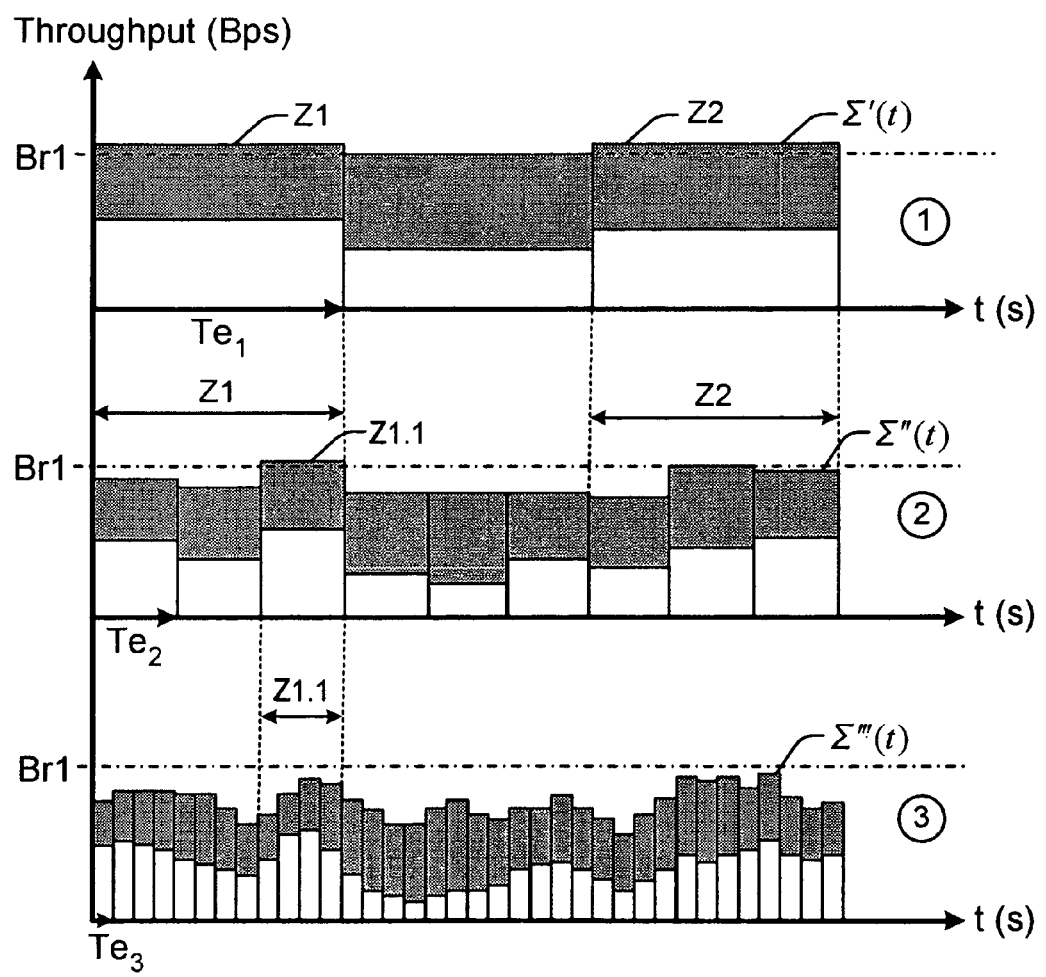

FIGS. 3a and 3b each illustrate respectively an exemplary management of a new data stream, by considering an instantaneous, respectively delayed, insertion;

FIG. 4 is a general flowchart of an algorithm for determining an instant of insertion of a new stream according to the invention;

FIGS. 5a and 5b illustrate a throughput smoothing principle applied at the output of the transmitter; and FIG. 6, an exemplary application of this principle in a management method according to the invention;

FIG. 7 is a detailed flowchart of an algorithm for determining an instant of insertion of a new stream;

FIG. 8a represents various profiles of the total throughput S(t) of the streams undergoing distribution corresponding to different sampling periods;

FIG. 8b represents various profiles of the throughput $R_n(t)$ of a new requested stream corresponding to different sampling periods;

FIG. 9 illustrates a first embodiment of a management according to the invention, using the various profiles illustrated in FIGS. 8a and 8b; and FIGS. 10a and 10b illustrate another embodiment of request admission management according to the invention.

5. DETAILED DESCRIPTION

For the sake of clarity, the same references are used for the elements common to the figures. Moreover, hereinafter, the following definitions apply:

requested stream, or new stream, is the stream corresponding to a request for remote access to a given multimedia content. This requested stream can in particular be a new request from a user, or a request to resume reading after a pause, in which case the stream to be considered is the remaining, as yet untransmitted, part of the stream. This can be a stream corresponding to a fast forward or a fast rewind. In all cases, a determined data stream corresponds thereto. For example, for normal reading, the stream corresponds to a transmission of 25 or 30 images per second. For fast forward, the stream corresponds for example to a transmission of 1 image every 12 images. Hereinafter, no distinction is made between these various requests related to reading functionalities offered by the service.

request for remote access to a multimedia content, is a VoD service request, transmitted by a user, either to read a multimedia content, or to resume the reading of a multimedia content after a pause, or any other type of reading offered by the VoD service, as they may also be found on a video recorder or a DVD reader.

Figure 1:
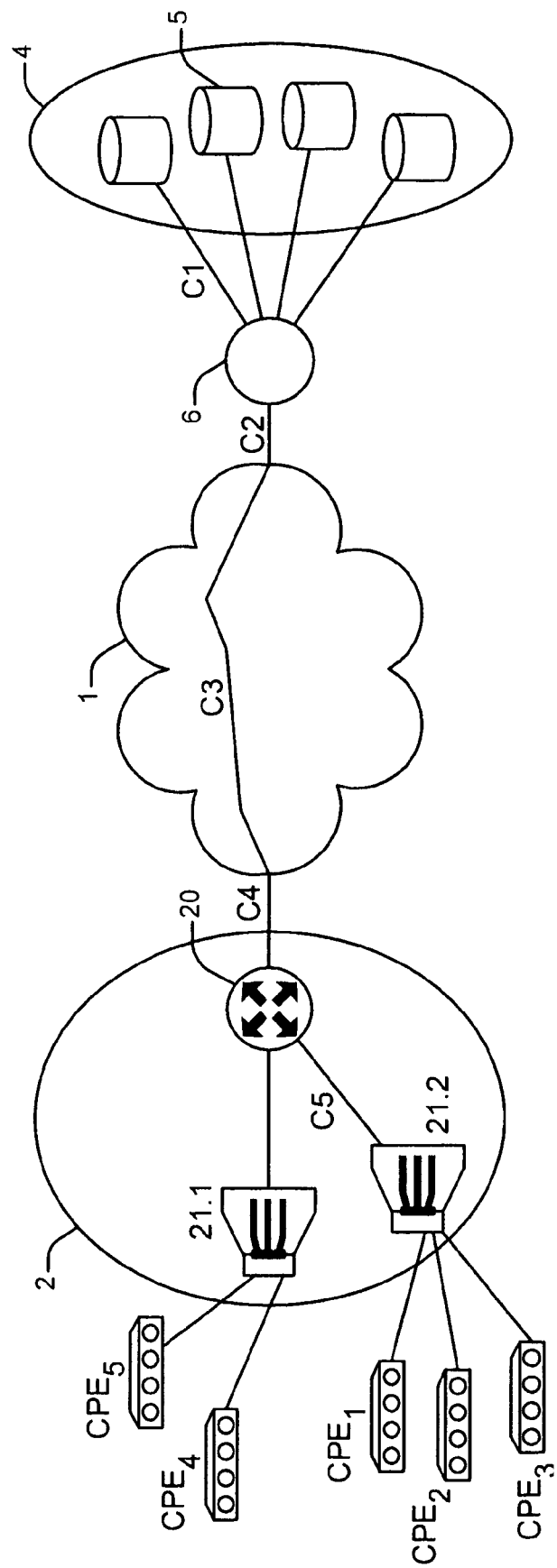
Figure 2A:
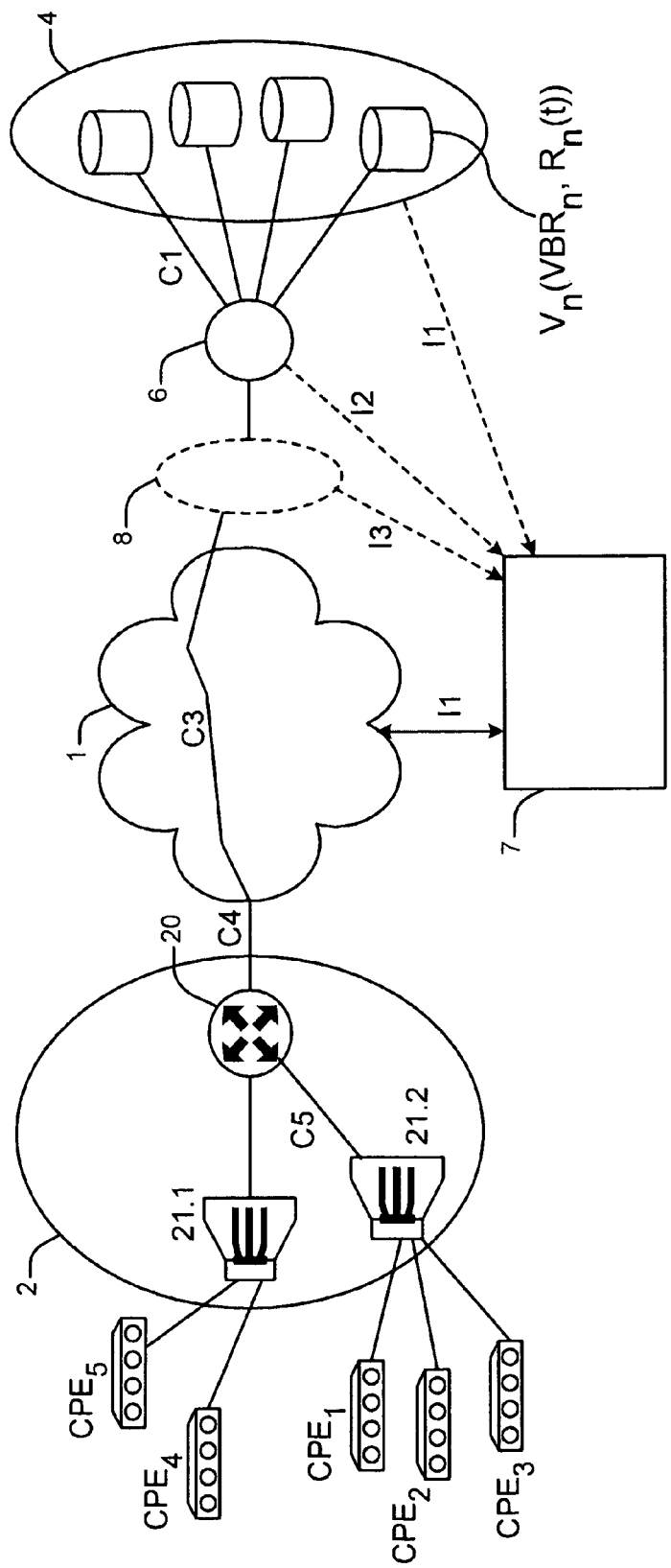
FIG. 2a illustrates a transmission network comprising a controller for managing remote access requests according to the invention.

A network for transmitting multimedia contents on demand, comprising a controller for managing the requests, in order to implement an optimized management method according to the invention is illustrated in FIG. 2a. In this network, the system part for transmitting the multimedia contents on demand comprises in addition to the server 4 and the transmitter 6, a management controller 7, for managing the new requests in an optimized manner. In the example, a throughput smoother 8 disposed between the transmitter 6 and the network core 1 is furthermore envisaged. This optional resource makes it possible to afford flexibility in the management of the network capacity, as will be seen further on. The server 4 provides the multimedia contents $V_n$ offered for transmission, in the form of variable-throughput digital streams $VBR_n$. With each of these streams $VBR_n$, the server 4 can match a throughput profile $R_n(t)$, which gives the instantaneous throughput at each instant t of the duration Tn of transmission of the associated multimedia content $V_n$. This profile $R_n(t)$ can be extracted when coding the multimedia content $V_n$ and stored on the server 4, for example in the form of a text file, at the same time as the resulting encoded data stream, $VBR_n$.

The management controller 7 can be a separate apparatus, connectable to the distribution network by a network interface i1, as illustrated in the figure. It can also be integrated with the server 4. It can establish communications with the other resources. In particular it can receive via the network interface i1, information from the server 4, in particular the profiles $R_n(t)$ of the multimedia contents $V_n$, the transmitter 6 or the throughput smoother 8, by establishing corresponding communications I1, I2, I3.

Figure 2B:
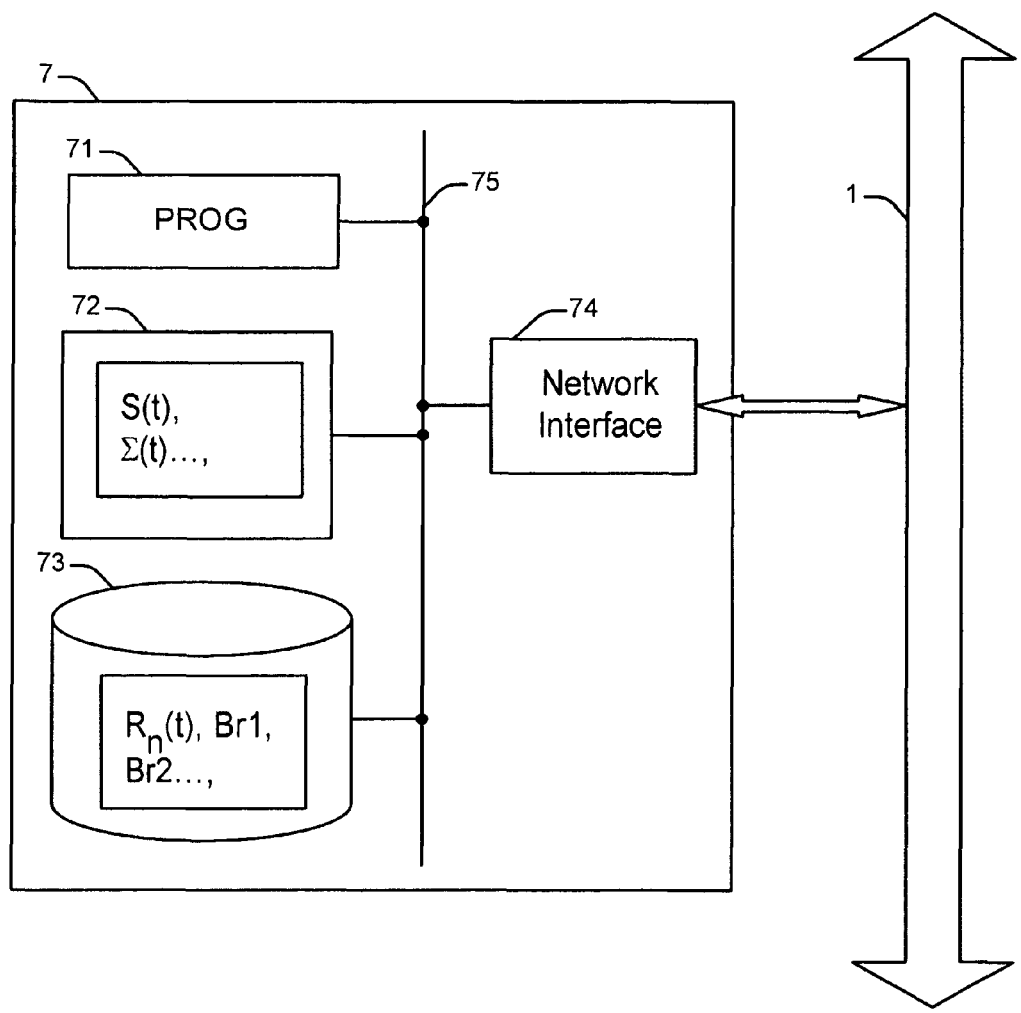
FIG. 2b shows an exemplary architecture of such a management controller.

The controller 7 has in particular the functions of detecting the new access requests, and of dealing therewith or of denying them, depending on the current capacity of the transmission network. More particularly, at each new request, or for at least part of them, it determines as a function of the total throughput of the streams being transmitted, whether it is possible to insert the corresponding requested stream into the multiplex stream in progress, either instantaneously, or by applying a determined delay, having regard to the maximum throughput allowable on the network. To achieve these functions, the management controller 7 comprises digital processing resources and a network interface. An exemplary corresponding architecture is illustrated in FIG. 2b, comprising various resources which communicate through an internal bus referenced 75, and in particular a processor 71 allowing the execution of the processing operations, in particular an algorithm for determining a possible instant of insertion for the new stream, an associated work memory 72 for storing data such as the total throughput of the streams in progress, denoted S(t) or the sum $\Sigma(t)$ of this total throughput with the throughput profile $R_n(t)$ of the new stream, or various data relating to the streams being transmitted, and a storage memory 73, such as a disk, making it possible in particular to store the profiles $R_n(t)$ of the multimedia contents offered by the service, characteristic data of the network, such as threshold values Br1, Br2 representative of the capacity of the network, parameters related to the data smoother 8 etc. The controller 7 furthermore possesses an interface referenced 74 with the content distribution network 1.

At each instant, the controller 7 knows which data streams are being transmitted on the network. It can determine the total throughput profile S(t), by summing the throughput profiles $R_n(t)$ of these various streams. This calculation is advantageously performed in advance, in real time. It can be calculated over a large duration, typically over the largest remaining duration of transmission among the streams of the multiplex. Thus, the real-time profile of the multiplex is available to the controller 7 at any moment. This calculation assumes for each stream being transmitted, that the controller 7 keeps in memory various items of information such as the pip for the start of the insertion of the stream into the multiplex, the instant at which reading was paused etc. These various items of information are obtained in a usual manner following the VoD service information exchanges between the various resources of the network and therefore will not be detailed further. It will be noted that it is quite possible to envisage calculating the profile S(t) of the multiplex only whenever a remote access request is received. The processing resources of the controller will be used less, but the real-time processing is then less optimum.

When a new request is transmitted by a user, the management controller 7 determines whether it is possible to insert the requested stream into the multiplex stream in progress, either instantaneously or with a certain determined delay, depending in particular on the profile S(t) of the multiplex stream in progress, and a threshold Br1, representative of the capacity of the network (dependent on the characteristics of the communication links of the transmission network considered). This determination can be done by considering various possible values of the delay, between a zero value (instantaneous insertion) and a maximum allowable value, that is to say a delay value which is of no consequence to the user. For each value, the insertion window for the corresponding requested stream is checked to verify whether the total throughput transmitted, having regard to the streams in progress, is less than or equal to the threshold. This verification can be performed according to various procedures. In particular it can be based on a calculation of aggregate throughput of the throughput of the new stream with that of the stream in progress, or on a calculation of a difference profile, between the maximum allowable throughput on the network and the throughput in progress (calculation of the available bandwidth), and a comparison of this difference profile with the profile of the new stream.

In the case of an insertion that is delayed, by a positive nonzero value $\Delta T$, the user will have to wait this additional lag $\Delta T$ before being able to view the content that he has requested. The maximum possible delay is determined so as to be of no consequence to the service. Typically a delay of a few hundreds of a millisecond to 1 second is of no consequence to the user, and therefore does not degrade the service.

A mode of determining an instant of insertion in accordance with the invention will now be explained to illustrate the invention. It is based on a procedure for aggregating the profile S(t) with the profile of the new stream. This mode is illustrated in conjunction with FIGS. 3a and 3b.

It is considered that the request is received at an instant t0 by the controller 7. To this access request there corresponds a data stream $VBR_n$ and a corresponding throughput profile. This profile is known to the controller 7: this is one of the data items that it contains in data memory 73, or else it can obtain it through the server 4. This profile has a width Tn, corresponding to the duration of transmission. The result of summing this profile $R_n(t)$ with the total throughput S(t) of the multiplex stream in progress depends on the moment at which the stream requested is inserted into the multiplex stream.

FIG. 3a illustrates the assumption of an instantaneous insertion of the requested stream, that is to say an insertion at t0. For simplicity it is considered that the instant t0 at which the request was received and the instant of instantaneous insertion of the stream into the multiplex coincide. In reality there are incompressible delays which in practice will have to be taken into account in the calculations.

The controller sums the total profile S(t) over the window [t0, t0+Tn], with the profile $R_n(t)$, making the start of the profile $R_n(t)$ coincide with t0: $\Sigma(t)=S(t)+R_n(t)$, for $t \in$ [t0, t0+Tn]. Over this window, the controller compares this profile $\Sigma(t)$ with the threshold $Br_1$ of maximum allowable throughput on the network. In the example illustrated, it detects three time zones 30.1, 30.2, 30.3 in which this threshold is exceeded. The instantaneous insertion of the stream requested into the multiplex in progress is therefore not possible.

FIG. 3b illustrates the assumption of a delayed insertion of the requested stream, by a value $\Delta T$ that is to say an insertion at $t0+\Delta T$. The controller sums the total profile S(t) taken over the window [$t0+\Delta T$, $t0+\Delta T+Tn$] with the profile $R_n(t)$, making the start of the profile $R_n(t)$ coincide with $t0+\Delta T$. The aggregate throughput $\Sigma(t)=S(t)+R_n(t)$, for $t \in$ [t0, t0+Tn] is obtained. Over this window, the controller compares this profile $\Sigma(t)$ with the threshold $Br_1$ of maximum allowable throughput on the network. In the example illustrated, it is then seen that the aggregate curve $\Sigma(t)$ obtained does not show any threshold overshoot zones: over the insertion window [$t0+\Delta T$, $t0+\Delta T+Tn$], the troughs and peaks of the two profiles S(t) and Rn(t) compensate one another judiciously. The access request will then be allowed and the requested stream will be inserted at the instant $t0+\Delta T$ with the stream of requests in progress. Generally, the step of determining an instant of insertion here involves utilizing the peaks and troughs of the two throughput curves S(t) and $R_n(t)$ to seek an optimum instant of insertion of the requested stream, so that at any point there is still a total throughput level that is at least less than or equal to the threshold $Br_1$. Stated otherwise, the best configuration of insertion, if it exists, of the profile is sought so as to insert the stream requested into the data stream in progress.

As illustrated in FIG. 4, a method of managing a remote access request according to the invention comprises the following steps:

- initialization step 100 comprising a step 100.1, to establish and/or fetch the real-time throughput profile S(t) of the multiplex stream, established either on demand, or as a real-time background task (task COMP (S(t)); a step 100.2, to search for the profile $R_n(t)$ of the requested stream, either in the memory 73 of the controller, or in the memory of the server 4;
- step 101 of verifying the threshold condition $Br_1$: if by making an instantaneous insertion assumption, the aggregate throughput profile $\Sigma(t)$ is at all points below the threshold $Br_1$ over the insertion window [t0, t0+Tn], accept the request and instantaneously insert the stream requested into the multiplex (step 101.1).
- step 102: if there exist one or more overshoot zones, search for an allowable delay value $\Delta T$, for which the aggregate profile is at all points less than or equal to the threshold $Br_1$ over the corresponding insertion window [$t0+\Delta T$, $t0+\Delta T+Tn$], so as to allow the request and insert the stream with the delay thus determined (step 102.1).

A refinement of the management of the access requests allows increased tolerance in the allowing of the requests. This refinement assumes that the transmission network comprises throughput smoothing means 8 between the output of the transmitter 6 and the distribution network 1, as illustrated in FIG. 2a.

Smoothing means are used in a known manner in systems for video transmission on networks of ATM (Asynchronous Transfer Mode) type, that is to say where the transmission of the data packets on the network is of the asynchronous type, with a network listening system, contrary to services like VoD services which are based on synchronous transmissions of the data packets. The smoothing technique makes it possible to allow a multiplex of data streams whose throughput locally exceeds at certain points the maximum throughput threshold for the transmission network. The function of the smoother is then to spread the data packets in these overshoot zones, that is to say to forward video data packets a little before or a little after the moment at which they should normally have been dispatched. Depending on the smoothing employed, greater or lesser overshoot is tolerated over a period of time, together with limited heights and durations of overshoot.

In the invention, the characteristics of a smoother 8 placed at the output of the transmitter 6 are used to obtain a tolerance, flexibility in the application of the overshoot criterion for the threshold $Br_1$ of the transmission network.

An exemplary implementation of this refinement is illustrated in FIGS. 5a and 5b. In FIG. 5a is represented by way of example, an aggregate throughput profile $\Sigma(t)$. This aggregate throughput varies about an average value Dm. It comprises peaks which exceed the threshold $Br_1$, in the example in each of the time zones 30.4 and 30.5. These overshoots in the zones 30.4 and 30.5 will be smoothed by the throughput smoother 8 ("rate shaper"). The smoothed curve $\Sigma_L(t)$ illustrated in FIG. 5b is obtained, which corresponds to the data throughput obtained at the output of the smoother: locally, in these zones, a spreading of the data packets is observed.

The tolerance in managing the allowing of requests will in practice depend on the smoothing characteristics implemented, which can depend in particular on technical constraints. In particular, the smoothing introduces jitter into the video stream, which jitter must remain within limits supported by the video decoding equipment, thereby giving rise in particular to an overshoot percentage span relating to a duration of overshoot. It will be possible for these data to be transmitted by the smoother 8 and stored by the controller 7 in data memory 73 (FIG. 2b).

In practice, the use of the possibilities offered by a smoothing, when it is provided for in the transmission network, will give rise to an additional step for deciding whether or not a request can be accepted. In the example illustrated in FIG. 6, it is assumed that the aggregate throughput curve exhibits locally, in a zone 30.6, a slight local overshoot of the threshold $Br_1$. If this overshoot meets the constraints of the smoother 8 in terms in particular of height and duration of overshoot, the management controller will accept the insertion of the requested stream, in the example with a delay $\Delta T$ on insertion.

A method for managing requests according to the invention thus allows nonstatistical but controlled management at any moment, of the throughput of the data streams in progress on the transmission network as well as optimization of the number of users of the VoD service that are simultaneously served.

In practice, an algorithm for determining an instant of insertion is called by the controller 7 at each new request, or at least for part of them. Specifically, below a certain number of on-line users, there is no network capacity problem, and it is not useful to implement the method of the invention for these requests.

The instant of insertion can be determined by successive tiers, using a determination loop and an associated loop stepsize. The loop is initialized with a zero delay $\Delta ti$ (corresponding to an instantaneous insertion assumption—FIG. 3a) and the threshold condition Br1 is checked. If the threshold condition is not satisfied, the delay $\Delta ti$ is incremented by the value m of the loop stepsize, and the threshold condition is checked and so on and so forth, until a delay value $\Delta ti$ is found for which the condition is satisfied, or a determined number of loops corresponding to a maximum allowable delay has been performed.

Refinements can be integrated with this algorithm. In particular, even if an instantaneous insertion is possible, provision may be made to check whether there exist delay values for which the insertion is also possible, and to choose an insertion with that of the determined delays which makes it possible to satisfy a stronger constraint in terms of network capacity threshold, typically for which the aggregate throughput would at all points of the insertion window be less than or equal to a threshold Br2 that is less than Br1, for example of the order of 5%. In this case, and as for example illustrated in FIG. 7, the controller initializes (step 100) a loop 200 for determining an instant of insertion: counter i=0, delay $\Delta ti$=0, obtain the profiles S(t) (step 100.1) and Rn(t) (step 100.2); and performs this loop K times, by incrementing the counter i by one unit (i=i+1) and the delay by one loop stepsize m ($\Delta ti=\Delta ti+m$) between each loop (step 300).

At each loop 200, the controller applies various steps:
step 200.1: determination of whether for the delay considered $\Delta ti$, the threshold condition Br1 is satisfied, if appropriate with smoothing (step 200.2).
step 200.3: if the condition in step 200.1 is satisfied, determination of whether the more constrained threshold condition Br2 is satisfied; to finish (step 200.4) depending on the results of the loop i, a table of possible solutions Si, indicating the value of the delay $\Delta ti$ (zero, or positive) on insertion and the associated threshold constraint: Br1, or Br2 which is satisfied.

For example, the following three solutions are obtained: S0($\Delta t0$=0; Br1) at i=0; S2($\Delta t2$=2.m; Br2) at i=2; S5($\Delta t5$=5.m; Br2) at i=5. The controller 7 will then be able to prefer the solution S2, to the solutions S0 and S5: in the corresponding insertion window, this solution leaves more bandwidth available than the solution S0, and this may facilitate the allowance of another future request; and it imposes a lesser delay on the insertion than the request S5.

In a practical example the value m of the loop stepsize can be of the order of 50 milliseconds and the maximum allowable delay for a user, without appreciable service degradation, of the order of 500 milliseconds to 1 second, thereby giving a maximum number K of loops of the order of 10 to 20.

Embodiments of the verification step that are efficacious in terms of calculation time and memory consumption can be implemented, in particular for processing the throughput profiles and comparing them with the threshold. It is useful at this juncture to specify a few concepts regarding the throughput profiles. The throughput profile of a stream gives the evolution as a function of time of the data throughput of this stream. The width of the profile corresponds to a duration of transmission of this stream. As multimedia data are involved, there are typically 25 to 60 video frames per second, according to the video mode (interlaced or progressive), a frame corresponding to an image or a half-image (interlaced mode) and the format (PAL, NTSC, etc.). A representation of a throughput profile can therefore be a set of data for example in a text file. Each datum of the file is a throughput sample of the stream for a given sampling instant. The sampling is such that over each sampling period, it is the highest throughput value which is employed as value of the sample.

One thus has a string of values, for example 1, 5, 8, etc. megabits per second (Mbs), for each sampling instant t0, t0+Te, t0+2.Te etc. One sampling a second appears to be a realistic value.

The management controller has access to the profile of each of the contents proposed by the service. It uses these profiles as has just been described to calculate the profile of the real-time throughput of the multiplex stream in progress, by reading the profiles of each of the streams of which it is composed, and by aggregating them while taking account of the start of each of the streams in this multiplex, that is to say taking account for each of the streams of the moment at which they were inserted.

On receipt of a request for remote access to a given multimedia content, the controller will read the throughput profile of the requested stream. It must then verify at any point, that is to say at each sampling instant, whether the sum of the throughput values at this sampling instant in the two profiles is less than or equal to the threshold. For multimedia contents whose duration of transmission may be as much as for example two to three hours, this pointwise verification may turn out to be somewhat irksome.

Instead of a single profile, for example one profile formulated a second (i.e. one sample per second), a first refinement of the invention provides for the use for each stream of a plurality of profiles obtained for different sampling periods, of a longer period, which will therefore give the fewest samples, to a shorter period which will give much more of them. This is done both for the multimedia contents distributed by the server, and for the multiplex of data streams. A concept of scale, corresponding to the sampling period considered, is thus introduced. This makes it possible to satisfy the throughput condition by successive approximations, by means of an iterative loop, selecting the largest scale first, then refining the search over possible detected overshoot zones, using an increasingly fine scale.

To illustrate this embodiment, three different sampling periods are considered: $Te_1$, for example equal to 3 minutes, $Te_2$, for example equal to 1 minute and $Te_3$, for example equal 15 seconds. These numerical values are given merely by way of example.

Represented in FIG. 8a are the three throughput profiles S'(t), S"(t) and S'''(t) obtained for a multiplex in progress on the network, respectively for each of the sampling periods $Te_1$, $Te_2$, $Te_3$.

Likewise, represented in FIG. 8b are the three throughput profiles $R_n'(t)$, $R_n''(t)$ and $R_n'''(t)$ of the requested stream, obtained respectively for each of the sampling periods $Te_1$, $Te_2$, Te.

In each profile, the throughput value employed for a given sampling period is the maximum value of the values representing the same period to a more precise sampling. For example in FIG. 8a, the value of the throughput of the first sample of $Te_1$ will be the maximum of the values of the first three samples of $Te_2$, this corresponding to the third value. The comparison with a network capacity threshold will then be done in three steps illustrated in FIG. 9:

in step ①, the coarsest sampling, corresponding to the largest sampling period $Te_1$, is considered. This is the sampling for which the corresponding data file comprises the fewest samples. Over each period, the corresponding samples of the two profiles $S'(t)$ and $R_n'(t)$, are summed to determine the zones on which there is an overshoot of the threshold Br1. In the example, two zones of potential overshoot Z1 and Z2 of the network capacity are identified. It is necessary to refine the verification in these zones Z1 and Z2. We go to step ②:

in step ②, the profiles $S''(t)$ and $R_n''(t)$ obtained with the shorter, second sampling period $Te_2$ are taken. And in the only zones Z1 and Z2 identified in step 1, the samples of these profiles are summed and we check to verify whether in these zones there are overshoot zones for the threshold Br1. In the example illustrated, a zone Z1.1 in which there is an overshoot is thus detected in zone Z1. For zone Z2, it is seen on the other hand that there is in fact no overshoot problem. For zone Z1.1, it is necessary to refine the verification by going to step ③ in step ③, the profiles $S''(t)$ and $R_n''(t)$ obtained with the even shorter second sampling period $Te_3$ are taken. In the only zone Z1.1 identified in step 2, the samples of these profiles are summed and we check to verify whether in this zone Z1.1 there are overshoot zones for the threshold Br1. In the illustrated example, there is in fact no overshoot in the zone Z1.1 identified. The request can be accepted.

The method which has just been described makes it possible to significantly reduce the number of calculations to be performed, by starting with files of throughput profiles comprising a reduced number of values, then by refining the processing only on the zones detected at risk, by doing successive zooms as it were.

If, ultimately, one or more zones in which the threshold is exceeded is or are found and if a throughput smoother is envisaged, consideration will be given as to whether the overshoot can be corrected by the smoother. Otherwise, the moment considered for inserting the requested stream into the current multiplex will be shifted by one notch, that is to say by a loop stepsize (FIG. 7), and the new profiles corresponding to the various sampling periods considered will be deduced therefrom. Steps ①, ②, ③ are repeated thereafter.

Each time that steps ①, ②, ③ are revisited, consideration is given, if appropriate, as to whether in the event of overshoot zones, it can be resolved by the smoother, otherwise we shift by an additional notch, and so on and so forth.

In practice, the number of different sampling periods used is determined to obtain a good compromise between the necessary calculation time and the service quality sought.

FIGS. 10a and 10b show another embodiment of the processing of the throughput profiles of the multiplex and of the requested stream. In this embodiment, one throughput profile per stream is used, that is to say a single sampling period, for example, a second. The improvement in the processing time is obtained here by ranking the samples in decreasing order of throughput values, with a corresponding sampling time. This ranking is applied to the profile of the requested stream, taking account of the time of the insertion instant considered and to the profile of the total of the streams in progress. For each insertion instant considered, the step of verifying the throughput condition is then applied:

by scanning the samples of the profile of the stream requested, beginning with the first, and by summing the throughput value of a sample, with that of the sample in the profile of the multiplex which corresponds to the same sampling time, and simultaneously by scanning the samples of the profile of the multiplex, beginning with the first, and by summing the throughput value of a sample, with that of the sample in the profile of the requested stream which corresponds to the same sampling time. These verification steps stop and the request is accepted as soon as the sum of the samples of like rank in the profiles $R_n(t)$ and $S(t)$ becomes less than the threshold Br1, since it is then certain that the samples which remain to be considered will be lower in throughput than those already considered: their sum will always be less than Br1.

Referring to FIG. 10a which illustrates the throughput profile $S(t)$ of a multiplex in progress, the samples s1, s2 . . . etc are ranked in decreasing order of throughput. Likewise, in FIG. 10b which illustrates the throughput profile $R_n(t)$ of a requested stream in progress, the samples r1, r2 . . . etc are ranked in decreasing order of throughput. The corresponding files then contain, for each sample, an item of information relating to the sampling instant which corresponds thereto. The processing method proceeds in the following manner:

it will search for the first sample r1 in the profile $R_n(t)$, sums it with the sample of the profile $S(t)$ which has the same sampling instant, s28 in the example and compares the sum with the threshold Br1; then it will search for the first sample s1 in the profile $S(t)$, and sums it with the sample of the profile $R_n(t)$ which has the same sampling instant, r34 in the example and compares the sum with the threshold Br1.

then it will search for the second sample r2, and sums it with the sample of the profile $S(t)$ which has the same sampling instant, s22 in the example and compares the sum with the threshold Br1; then it will search for the second sample s2, and sums it with the sample of the profile $R_n(t)$ which has the same sampling instant, r29 in the example and compares the sum with the threshold Br1. And so on and so forth etc.

at the same time, it sums the samples of like rank pairwise and compares them with the threshold Br1, until it reaches the rank k for which $rk+sk \leq Br1$.

The algorithm stops there: for the samples of the following ranks, the cross sum will always be less than or equal to Br1. There can no longer be any overshoot with the samples of higher rank. In the example, the algorithm stops for k=10.

In the example illustrated in FIGS. 10a and 10b, there is no threshold overshoot. The request can be allowed.

Should there be one or more overshoots, the principles indicated previously would be applied: if throughput smoothing is envisaged, consideration is then given as to whether the smoothing can be applied for these overshoots. If not, the profile of the requested stream is shifted by one notch, and the processing algorithm is rerun. Either an allowable delay is found after one or more notches (loops), and the request is allowed by inserting the stream with a corresponding delay, or no allowable delay is found and the request is denied.

The invention is not limited to the verification procedures which have just been described. Other procedures can be used to verify whether it is possible to transmit the stream requested at a given instant. In particular, it is possible to use a procedure based on a difference in profiles. For example, according to this procedure, to verify whether it is possible to transmit a stream requested at a given instant:

the difference between a profile corresponding to the maximum throughput (or capacity of the distribution network) and the profile $S(t)$ corresponding to the total throughput of the whole set of streams in progress is calculated;

then, for each possible instant of insertion, a check is performed to verify whether the throughput profile of the stream corresponding to the request is less than or equal to the calculated difference.

In a variant, it is possible to perform a search step to find the best candidate or candidates for the shift. Thus, according to this variant, it is possible to perform a cross-correlation between a difference profile, that is to say the available bandwidth (difference between a profile corresponding to the maximum throughput (or capacity of the distribution network) and the profile corresponding to the total throughput of the whole set of streams in progress) and the throughput profile of the stream corresponding to the request. An insertion time corresponding to the cross-correlation maximum is then chosen. It is recalled that according to the mathematical definition, a cross-correlation function g inter-correlating two functions f1 and f2 is a scalar product of the two functions f1 and f2 for all the values of the possible shift u: $g(u) = \int f1(t) \cdot f2(t-u) \, du$. Here, this involves performing the cross-correlation operation over a discrete set of samples (discrete sum) and calculating the cross-correlation for one or more shift values. The largest cross-correlation value or values corresponds or correspond to the shift value or values which have to be tested by priority to verify the insertion condition for the requested stream.

Variants of these embodiments can be applied which do not depart from the framework of the invention. In particular, for a given multimedia content it is possible to pre-calculate the profiles associated with functionalities of the service: fast forward or rewind; update the profiles associated with the activation of the pause mode etc. Whichever procedure is used, the determination of an allowable or optimum instant of insertion must be done before this instant is overshot. Thus the procedure chosen will be more or less efficacious depending on the capacities of the controller's processing resources.

The invention claimed is:

1. Method of managing a request for remote access to a multimedia content from among a plurality of multimedia contents provided by a server in digital data stream form, allowing a transmission of a set of data streams provided by the said server to a distribution network as a function of a capacity threshold of the said distribution network, wherein that the said digital data streams are of the variable-throughput type, at least one data throughput profile being associated with each stream, said at least one data throughput profile giving an instantaneous throughput at each instant t of a duration Tn of transmission of said multimedia content, and in that for at least part of the remote access requests received, the management method comprises a step of determining at least one instant of insertion of a data stream corresponding to a request received, as a function of a first throughput profile corresponding to the set of streams in progress, and of a second throughput profile corresponding to the throughput profile associated with the stream corresponding to the said request, the said instant of insertion being able to correspond to an instantaneous insertion of the requested stream, or a delayed insertion, the step of determining at least one instant of insertion comprising a verification of at least one first condition over a corresponding insertion time window, defined from a first instant of insertion over a duration corresponding to a transmission time of the requested stream, the instant of insertion being chosen as a function of the result of the verification, the first condition being satisfied if the total data throughput corresponding to a sum of the said first profile and of the said second profile is less than or equal to the said capacity threshold of the said distribution network.

2. Management method according to claim 1, wherein the said verification is based on a calculation of a throughput aggregated over the said insertion window of the said first and second profiles.

3. Management method according to claim 1, wherein the said verification is based on a calculation of a difference profile between the said first profile and a maximum throughput on the said network.

4. Management method according to claim 3, wherein a calculation of a cross-correlation function is performed between the said difference profile and the said second profile, by considering various instants of insertion, and a search for cross-correlation maximum or maxima is performed.

5. Management method according to claim 1, comprising a step of selecting an instant of insertion from among a plurality of instants of insertion satisfying the said first condition, on the basis of the satisfaction of a more constraining throughput condition.

6. Management method according to claim 1, wherein a data throughput smoothing is envisaged between the transmitter and the distribution network, wherein the said first condition is applied with an overshoot tolerance of the threshold, dependent on the duration and the height of the said overshoot.

7. Method according to any one of claim 1, wherein with each data stream is associated at least one data throughput profile obtained by sampling, the value of a sample being equal to the maximum throughput found over the corresponding sampling period.

8. Method according to claim 7, wherein for each data stream, a plurality of throughput profiles is formulated, each corresponding to a determined sampling period, giving a plurality of throughput profile scales, a first scale corresponding to a longest period, until a last scale corresponding to a shortest period, and in the step of determining an instant of insertion, for a given instant of insertion:

a) the first and second profiles in the first scale are selected, and the said step of verifying the first condition is instigated on the width of the second profile and if the first condition is not satisfied, the following loop is applied:

b) the time zones on which the said condition is not satisfied are identified, the first and second profiles are selected in the following scale, and the said step of verifying the first condition is instigated on the said identified time zones, steps a) and b) being applied until the last scale or until the first condition is satisfied on each of the said zones.

9. Method according to claim 7, wherein the samples of a profile are ranked in decreasing order of throughput values, with a corresponding sampling time, the said sampling time taking account of a relevant instant of insertion for the samples of the profile of the requested stream, and for the said relevant instant of insertion, the step of verifying the said first condition is applied:

by scanning the samples of the second profile, beginning with the first, and by summing the throughput value of a sample, with that of the sample in the first profile which corresponds to the same sampling time, simultaneously by scanning the samples of the first profile, beginning with the first, and by summing the throughput value of a sample, with that of the sample in the second profile which corresponds to the same sampling time, and the request is accepted as soon as the sum of the samples of the same rank of the said first and second profiles becomes less than the said threshold of the network.

10. Method according to claim 1, wherein it is applied to each of the access requests received.

11. Apparatus connectable to a distribution network of a system for transmitting multimedia contents on demand provided by a multimedia server in the form of variable-throughput digital data streams, the said apparatus comprising memory resources for storing throughput profiles of the said data streams, said throughput profiles giving an instantaneous throughput at each instant t of a duration Tn of transmission of said multimedia contents, and digital processing resources able to implement an algorithm for determining an instant of insertion of a new digital data stream corresponding to a request for access to a multimedia content, to a set of data streams being transmitted on the said network, on the basis of the throughput profiles of the said new stream and of the said data streams in progress, the said instant of insertion being able to correspond to an instantaneous insertion of the requested stream, or a delayed insertion, the determination of at least one instant of insertion comprising a verification of at least one first condition over a corresponding insertion time window, defined from a first instant of insertion over a duration corresponding to a transmission time of the requested stream, the instant of insertion being chosen as a function of the result of the verification, the first condition being satisfied if the total data throughput corresponding to a sum of a first profile and of a second profile is less than or equal to a capacity threshold of the said distribution network.

12. System for transmitting multimedia contents on demand comprising:

a control apparatus connectable to a distribution network of a system for transmitting multimedia contents on demand provided by a server of multimedia contents in the form of variable-throughput digital data streams, the said apparatus comprising memory resources for storing throughput profiles of the said data streams, said throughput profiles giving an instantaneous throughput at each instant t of a duration Tn of transmission of said multimedia contents, and digital processing resources able to implement an algorithm for determining an instant of insertion of a new digital data stream corresponding to a request for access to a multimedia content, to a set of data streams being transmitted on the said network, on the basis of the throughput profiles of the said new stream and of the said data streams in progress, the said instant of insertion being able to correspond to an instantaneous insertion of the requested stream, or a delayed insertion, the determination of at least one instant of insertion comprising a verification of at least one first condition over a corresponding insertion time window, defined from a first instant of insertion over a duration corresponding to a transmission time of the requested stream, the instant of insertion being chosen as a function of the result of the verification, the first condition being satisfied if the total data throughput corresponding to a sum of a first profile and of a second profile is less than or equal to a capacity threshold of the said distribution network; and the server of multimedia contents in the form of variable-throughput digital data streams, in which throughput profiles corresponding to the said data streams are stored in the server at the time of the encoding of the multimedia contents by which the said data streams are generated, and the said profiles are transmitted by the server so as to be stored in the said apparatus.

13. System for transmitting multimedia contents according to claim 12, wherein the said control apparatus is integrated within the said server of multimedia contents.

* * * * *